United States Patent Office 3,350,467
Patented Oct. 31, 1967

3,350,467
METHOD FOR SIDE-CHAIN CHLORINATION OF XYLENE
Ralph H. Lasco, Painesville, Ohio, assignor to Diamond Alkali Company, Cleveland, Ohio, a corporation of Delaware
No Drawing. Filed Apr. 20, 1966, Ser. No. 543,819
11 Claims. (Cl. 260—651)

This invention relates to chlorinating xylene side chains for chlorine-free xylene or xylene which has been previously chlorinated in part, and more particularly relates to a method of chlorinating the side chains of such xylene where the xylene contains minute amounts of metal ions which can promote ring activity of the xylene during chlorination.

It is known that metal ions, particularly from iron, zinc, and aluminum which can be contributed from corresponding compounds of these metals, such as ferric oxide, act as Lewis acids during halogenation to promote aromatic ring substitution when present during the halogenation of benzene, toluene, xylene and similar compounds. Generally as much as one percent or more of ferric halides, based on the weight of the aromatic material to be substituted, are used as a catalyst when ring substitution is the desired reaction, although even trace amounts can yield rapid substitution.

The powerful catalytic effect of the metal ions in promoting ring halogenation for toluene, xylene, and the like, is particularly evident when such halogenation is accompanied by thermal catalysis, i.e., heat-promoted halogenation, or catalysis by light radiation, such as sunlight or the light emitted from a mercury vapor lamp. Even though catalysis by heat and/or light is used, both of which are well known for promoting the side chain substitution, if, simultaneously, some minute amounts of metal ions are present, the resulting reaction material will contain substantial amounts, e.g., 30 weight percent or more, of ring substituted product.

It is also known that certain halogenating agents, some of which are serviceable for contributing halogen to toluene, p-xylene and the like, specifically the chlorides and bromides of phosphorous, additionally are capable of promoting side chain halogenation, without inducing substitution in the aromatic nucleus, even when alternative halogenating agents are used, e.g., gaseous chlorine or sulphuryl chloride, in conjunction with these phosphorous halides. Thus, phosphorous trichloride has been used industrially to catalyze the preparation of benzyl chloride and benzal chloride from toluene.

It has now been found that in the liquid phase chlorination of xylene with gaseous chlorine, where the xylene contains trace amounts of metal ions, that the bromides and chlorides of phosphorous can be used to successfully sequester the catalyzing action of metal ions. Sequestered ions can permit virtually complete side chain chlorination during reaction of xylene and gaseous chlorine, even when such often employed nuclear-substitution catalysts as ferric chloride are present in the xylene. Hence, for xylene containing as much as 25 p.p.m. of iron, excellent yields of side chain chlorinated product can be prepared, with sequestration, and without prior rectification of the ion-contaminated xylene.

Additionally where chlorinolysis, i.e., side chain cleavage from the benzene nucleus, is promoted by such contamination during side chain chlorination at elevated temperature, especially in the exhaustive side chain chlorination of xylene, such chlorinolysis promotion is effectively suppressed by the phosphorous bromide or chloride sequestrant. Moreover, the phosphorous bromide or chloride sequestrant can desirably suppress the action of any gaseous oxygen contained in the xylene and additionally can dehydrate the xylene to suppress the effect of water contamination. Dissolved or entrained oxygen can retard the activity of the catalyst used, as can water, thereby slowing the reaction rate, which often has necessitated blowing an inert gas such as nitrogen through the xylene to remove the oxygen as well as distillation to remove water. Furthermore, the coloration in xylene which is contributed by the contamination decreases the chlorine efficiency in light-catalyzed reaction, i.e., such coloration retards light catalysis and permits chlorine to remain in the system without reaction. Phosphorous bromide or chloride sequestering agents can mask this coloration effect and thus enhance chlorine efficiency in light catalyzed reaction.

Broadly, the present invention is directed to a method of preparing side chain chlorinated xylene from a xylene which is chlorine free or which has been previously chlorinated in part (as discussed more specifically hereinbelow) and which contains metal ion contaminants capable of promoting ring activity of such xylene, which method comprises reacting under catalytic influence gaseous chlorine and such xylene in the presence of a sequestering amount of metal ion sequestering agent selected from the group consisting of the chlorides and bromides of phosphorous and their mixtures.

One specific aspect of this invention is the method of chlorinating the above-mentioned contaminated xylene (or contaminated partially chlorinated xylene), which method comprises establishing a liquid reaction medium of contaminated xylene at a temperature above the melting point of the xylene, admixing the resulting reaction medium with one or more of the sequestering agents described herein, reacting under catalytic influence the xylene in the resulting admixture with gaseous chlorine while maintaining the reaction medium in the liquid state by temperature regulation.

A further aspect of this invention is the suppression of metal ion-promoted chlorinolysis during the side chain chlorination of xylene usually at elevated temperature.

Another aspect of this invention is the retardation to elimination of the deleterious, catalyst-suppressing activity which can result from oxygen and/or water contained in the xylene.

A still further aspect of this invention is the masking of the deleterious, contaminant coloration effect, thus enhancing chlorine efficiency for light catalyzed reaction.

As used herein, the term "ring activity" is meant to include any chlorinolysis or chlorination of the aromatic nucleus, i.e., of the benzene ring portion of the xylene. Often the alkyl groups attached to an aromatic nucleus are referred to as "side chains" and such term is used herein to refer to the methyl (or chloromethyl) groups of the xylene.

The xylene starting material for chlorination is ortho-, meta-, or para-xylene or their mixtures, or can be xylene which has been previously chlorinated in part, either ring chlorinated or side chain chlorinated, or both, but which is nevertheless capable of receiving initial, or further, side chain chlorination. Thus, all starting materials which are intended within the scope of this invention are compounds corresponding to the formula:

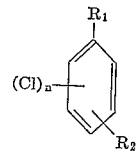

In this formula $n$ is 0, 1, 2, 3, or 4. When $n$ is 1, 2, or 3, $R_1$ and $R_2$ each represent chloromethyl radicals; when $n$ is 0 or 4, $R_1$ and $R_2$ are the same or different and represent either methyl or chloromethyl radicals. Thus for intermediate (less than exhaustive) ring chlorination, i.e., for some nuclear chlorination but less than 4 chlorine atoms on the aromatic nucleus, $R_1$ and $R_2$ must be chloromethyl. If not, considerable condensation products, such as diphenylmethane derivatives, will be formed during further chlorination instead of the desired side chain chlorinated substances.

As used herein "chloromethyl" can be monochloromethyl or dichloromethyl and thus representative starting materials include: α-chloro-o-, α-chloro-m-, and α-chloro-p-xylene as well as the correspoding α,α'-dichloro structures, and also α,α'-2-trichloro-p-xylene, α,α'-2,4,5,6-hexachloro-m-xylene, α,α,α',α' - tetrachloro-p-xylene, and α,α,α',α',2,4,5,6-octachloro-m-xylene. When a particular compound is to be enumerated herein it will be specifically referred to by the number and position of the chloro-substituents in the molecule, and the ortho, meta, or para structure will be specifically indicated in conventional manner.

Usually, by contact with dust, dirt or metallic containers or feed lines, xylene can pick up and accumulate minute amounts of metal ions, which can often be as great as 25 p.p.m. or more. Generally, when their concentration is below about 0.1 p.p.m. in the xylene and the xylene is free from ring chlorination, where ring chlorination rather than chlorinolysis is the preponderant deleterious reaction, such ring chlorination remains virtually unpromoted. Above about 0.1 p.p.m. and up to about 25 p.p.m. of metal ions, phosphorous chlorides or phosphorous bromides can be effectively employed to sequester the ring promoting activity of these trace amounts. However, when these trace amounts of metal ions exceed about 25 p.p.m., enhanced production of side chain chlorinated xylene can become difficult to achieve and sequestration can become uneconomical.

Xylene which has been previously ring chlorinated, with partial to no side chain chlorination, e.g., 2,3,5,6-tetrachloro-p-xylene which is free from side chain chlorination, can contain as much as 5 weight percent or more of metal ions which were used to prepare the ring chlorinated compound. Generally, when the concentration of metal ions in such ring chlorinated xylene are below about 0.01 weight percent, i.e., below about 100 p.p.m., basis weight of the xylene, chlorinolysis, which is the preponderant deleterious reaction in subsequent side chain chlorination, remains virtually unpromoted. When the ion-contamination in the ring chlorinated xylene is greater than about 5 weight percent, enhanced production of side-chain chlorinated product, such as α,α'-2,3,5,6-hexachloro-p-xylene, can become difficult to achieve.

To effectively sequester the metal ions, either for retarding ring chlorination for the about 0.1–25 p.p.m. amounts of metal ions, or for retarding chlorinolysis for the about 0.01–5 weight percent amounts of metal ions, as well as to suppress the activity of oxygen and/or water contained in the xylene, between about 0.1–10 weight percent of sequestering agent is used, based on the weight of the xylene. Less than about 0.1 weight percent is generally insufficient to provide efficacious retardation of ring activity for any concentration of metallic ions, while use of more than about 10 weight percent will usually not provide for enhanced suppression of the metal ions catalyzing activity and can be uneconomical. Usually for xylene which is free from ring chlorination and contaminated with as much as about 3–15 p.p.m. of metal ions, or for ring halogenated xylene containing about 0.1–3 weight percent of metal ions, which xylene in either instance can also be contaminated with oxygen and/or water picked up in normal handling and storage, there is preferably used between about 0.6–6 weight percent of sequestrant for efficient and economical suppression of the metal ions as well as oxygen and/or water activity.

As used herein the expression "phosphorous halide" sequestering agent is meant to include phosphorous trichloride or phosphorous pentachloride, also referred to herein as "phosphorous chlorides," as well as phosphorous tribromide or phosphorous pentabromide, also referred to herein as "phosphorous bromides." For efficiency, these agents are preferably used in their commercially available, essentially anhydrous form since addition with solvents such as water can retard initiation of chlorination. For efficency and economy, phosphorous trichloride is preferred.

The chlorination is carried out at a temperature above the melting point of the xylene to provide a reaction medium free from solid xylene, and thus enhance the reaction rate. During chlorination, temperature regulation is then employed to maintain the liquid medium, i.e., the temperature is regulated to insure that chlorinated reaction products are maintained above their temperature of crystallization, to prevent unchlorinated xylene from becoming entrapped in solid product. Advantageously to enhance reaction rates, reaction temperatures initially are about 20°–40° C. above the xylene melting point, but for economy chlorination temperatures are usually not in excess of about 250° C. Low temperatures, that is from about 15° to about 90° C. are generally employed at the outset in chlorinating xylene which is free from ring chlorination since the initial use of such low temperatures retards deleterious side reactions, such as the formation of diphenylmethane derivatives. However, initial reaction temperatures of as much as about 135° C. can be used with xylene which is free from ring chlorination, without uneconomical formation of side reaction products, when continuous, careful control is exercised over reactant feed rates and the reaction temperature.

As chlorination proceeds, conditions for the formation of diphenylmethane derivatives abate and the reaction temperature can be increased to promote the chlorination rate without enhancing an increase in the rate of side reactions. For example, after xylene has been chlorinated with about 0.5–3 moles of chlorine per mole of xylene, when more exhaustive xylene halogenation is conducted, the reaction temperature can be elevated to as much as about 250° C., and preferably to between about 150–220° C. for efficiency and economy. For chlorinating previously ring chlorinated xylene, having partial to no side chain chlorination, where chlorinolysis is the primary deleterious side reaction, elevated initial chlorination temperatures above about 200° C. can be employed. For example, α,α'-2,4,5,6-hexachloro-m-xylene can be effectively chlorinated to α,α,α',α'-2,4,5,6-octachloro-m-xylene at a temperature between about 215°–235° C. while effectively suppressing chlorinolysis with the phosphorous halide.

Although subatmospheric or atmospheric pressures can be employed, to enhance solubility of the chlorine in the liquid reaction medium, elevated pressure, i.e., in excess of atmospheric is suitably used. Advantageously a pressure between about 3 to about 45 p.s.i.g. is used during reaction, since pressures below about 3 p.s.i.g. do not generally promote rapid solubility of gaseous chlorine in the reaction medium whereas a pressure above about 45 p.s.i.g. can be uneconomical. For enhanced efficiency and economy, a pressure of about 10–35 p.s.i.g. is used. If desired, the gaseous chlorine can be diluted with an inert gas such as nitrogen, e.g., to assist in controlling the rate of chlorination.

The liquid reaction medium can contain some liquid dispersant, which is essentially inert during chlorination of the xylene, such as carbon tetrachloride, benzene, or acetic acid. Ring chlorinated benzenes, e.g., chlorobenzene, ortho-, meta-, or para-dichlorobenzene, pentachlorobenzene, 1,2,4,5-tetrachlorobenzene, sym-, or as-trichlorobenzene, or mixtures of these compounds, are preferred since their generally elevated boiling points, i.e., 200° C. or more (at 760 mm. Hg pressure), permit their use over an extended temperature range. It has been found that although these chlorinated benzenes are used in the presence of powerful ring halogenating catalysts, they remain virtually unreacted during xylene chlorination when the phosphorous chloride or bromide sequestering agents are present in the liquid reaction medium. Advantageously for economy less than about 10 volume percent, basis volume of xylene reactant, of the preferred chlorinated benzene diluents are used with ortho-, meta-, or para-xylene or their mixtures, and for enhanced economy, use of less than about 0.5 volume percent therewith is preferred.

However, where the dispersant is used to dissolve hydrocarbons which are not readily soluble, the resulting reaction medium can be preponderantly liquid dispersant, e.g., up to 95 volume percent or more chlorobenzene solvent can be used to dissolve a 5 volume percent balance of $\alpha,\alpha'$-2,4,5,6-hexachloro-m-xylene. During elevated temperature chlorination, i.e., at a temperature above the boiling point of the diluent at the pressure of the reaction, vaporized diluent can be condensed and recycled back to the reaction medium, or some to all of this vapor loss can be made up by a fresh feed of diluent to the reaction medium. The reaction products can be isolated from the dispersant by cooling the reaction medium to crystallize out the reaction products followed by decantation of the mother liquor containing the liquid dispersant.

Chlorination of the xylene is typically carried out in a steel reactor or one formed from iron or other conventional material and capable of withstanding the pressures discussed hereinbefore, which reactor is lined such as with a glass liner to prevent contaminating contact between the metal reactor and the xylene. The reactor is equipped typically with agitation means, xylene inlet means, chlorine inlet, temperature control means, pressure control means, and product outlet. If desired, several reactors can be sequentially arranged particularly in the preparation of highly chlorinated xylene from starting xylene which is chlorine-free. For example, in the preparation of $\alpha,\alpha,\alpha,\alpha',\alpha',\alpha'$-hexachloro-p-xylene from p-xylene, an initial reactor maintained within the temperature range of between about 15° to about 135° C. can be used for reacting about 0.5–3 moles of chlorine per mole of p-xylene to prepare a substantial amount of $\alpha,\alpha'$-dichloro-p-xylene, and a separate reactor maintained at a temperature between about 135° and about 250° C. can be used for reacting about 3–5.5 moles of chlorine per mole of starting xylene to prepare the $\alpha,\alpha,\alpha,\alpha',\alpha',\alpha'$-hexachloro-p-xylene.

In the reaction, the chlorination is carried out to completion as determined by evolution of the desired amount of hydrogen chloride. The product desired will dictate the amount of chlorine to be added, in view of the fact that essentially the stoichiometric amount or a slight excess is normally used. A substantial excess of chlorine may be advantageous in certain instances where a highly chlorinated material is desired, as in the chlorination of p-xylene to $\alpha,\alpha,\alpha,\alpha',\alpha',\alpha'$-hexachloro-p-xylene. However, by employing less than the theoretical amount of chlorine required, over-chlorinated products will be substantially avoided, such as the formation of $\alpha,\alpha,\alpha'$-trichloro-p-xylene in the chlorination of p-xylene to prepare $\alpha,\alpha'$-dichloro-p-xylene.

Catalysis, e.g., heat or light catalysis, during chlorination is essential, but only to accelerate the chlorination since their promotion of the side chain reaction is effectively offset by the metal ion contamination, as has been discussed hereinbefore. This catalysis can be provided by any conventional free radical initiator such as an actinic light source, thermal initiation, or the addition of a conventional free radical initiating chemical such as benzoyl peroxide. Preferably for economy and efficiency a visible light source is used at the outset of chlorination with any of the phosphorous halide sequestrants and where a chlorine-free xylene is the starting material, and thermal catalysis is used thereafter or for a ring-chlorinated starting material. A suitable actinic light source can be a mercury vapor lamp which can be maintained in a cooled immersion well, fluorescent lamps, either white, blue or black, or clear or unfrosted incandescent lamps.

During elevated temperature chlorination, e.g., at temperatures above about 150° C., any phosphorous halide sequestering agent which fumes from the liquid reaction medium can be replaced by feeding fresh sequestrant to the liquid reaction medium. When the desired chlorination is terminated, removal of virtually all sequestrant from the chlorinated product can generally be accomplished by crystallizing out chlorinated product and decanting the agent with the mother liquor. An alternative method for removing sequestrant from the chlorinated xylene is to extract the sequestrant with water or other suitable solvent.

The following example shows a way in which the invention has been practiced, but should not be construed as limiting the invention. In the example, all parts are parts by weight and all degrees are in degrees centigrade unless otherwise specified. The "dichloro-p-xylene" of the example is $\alpha,\alpha'$-dichloro-p-xylene.

In the example, solution A is filtered p-xylene containing, after filtration, about 0.1 p.p.m. iron. Solution B is a more highly iron contaminated solution prepared by dissolving ferric chloride into distilled p-xylene, with agitation, and allowing the solution to stand for two days followed by filtering to remove insolubles. Solution B contains 20 p.p.m. iron.

The iron content of these solutions is determined by the thiocyanate test method described in Colorimetric Determinations of Traces of Metals, by E. B. Sandell, vol. III, 1950, p. 363. Ring chlorination and production of dichloro-p-xylene both expressed as mole percents of final product, are determined by analysis of such product by total area vapor phase chromatography.

*Example*

Reaction material containing about 5.1 p.p.m. iron is prepared from 74.9 parts of solution A mixed with 25.1 parts of solution B and the resulting mixture is separated into three aliquot portions designated C, D, and E. Additionally, a reaction mixture containing about 3.0 p.p.m. iron is prepared from 85.4 parts of solution A mixed with 14.6 parts of solution B and the resulting mixture is used as portion F. Sequestering agents are admixed with portions D, E, and F in the amounts shown in the table below.

Each portion is then separately placed in a glass flask and the contents heated to a temperature of 80°. As the 80° temperature is maintained, chlorine gas is bubbled into each flask, while the reaction is catalyzed by a 22-watt fluorescent lamp, until 1.8 moles of chlorine react per mole of p-xylene, as measured by the amount of hydrogen chloride which evolves from each flask. Ring chlorination and dichloro-p-xylene production determinations are then run on each portion and the results are set forth in the table below. For each portion the balance of the reaction product is essentially $\alpha$-monochloro-, $\alpha,\alpha$-dichloro-, and $\alpha,\alpha,\alpha'$-trichloro-p-xylene.

TABLE

| Portion | Iron, p.p.m. | Weight Percent $PCl_3$ | Weight Percent $PCl_5$ | Mole Percent Ring Chlorinated Product | Mole Percent Dichloro-p-xylene Produced |
|---|---|---|---|---|---|
| C | 5.1 | 0 | 0 | 31 | 21.7 |
| D | 5.1 | 0.7 | 0 | 2 | 44.8 |
| E | 5.1 | 1.0 | 0 | 1.1 | 47.7 |
| F | 3.0 | 0 | 1.0 | 0.3 | 47.6 |

As will be seen from the table, in the C portion with no sequestering agent, there is prepared an undesirable yield of dichloro-p-xylene and similarly there is prepared a substantial, ion-catalyzed yield of ring chlorinated material. Additionally from the table it is seen that the phosphorous trichloride and phosphorous pentachloride both produce an excellent suppression of ring chlorination as well as permitting an excellent yield of dichloro-p-xylene, when the PCl₅ is used for the moderately heavy 3.0 p.p.m. contamination and when the PCl₃ is used for the more severe 5.1 p.p.m. contamination.

It is to be understood that although the invention has been described with specific reference to particular embodiments thereof, it is not to be so limited, since changes and alterations therein may be made which are within the full intended scope of this invention as defined by the appended claims.

What is claimed is:

1. The method of chlorinating side-chain substituents of a compound corresponding to the formula:

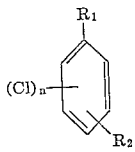

where $n$ is 0, 1, 2, 3, or 4; and,
when $n$ is 1, 2, or 3, $R_1$ and $R_2$ are chloromethyl; and
when $n$ is 0 or 4, $R_1$ and $R_2$ are the same or different and are methyl or chloromethyl;
wherein said compound contains metal ion contaminants capable of promoting ring activity of said compound, which method comprises reacting under free radical catalytic influence gaseous chlorine and said compound in the presence of a sequestering amount of metal ion sequestering agent selected from the group consisting of the chlorides and bromides of phosphorous and their mixtures.

2. The method of claim 1 which comprises the steps of:
   (a) establishing a liquid reaction medium of said compound at a temperature above the melting point of the compound;
   (b) admixing the resulting liquid reaction medium with between about 0.1–10 weight percent, basis weight of the compound, of said metal ion sequestering agent; and
   (c) reacting under free radical catalytic influence the compound in the resulting admixture with gaseous chlorine; while
   (d) maintaining the reaction medium in liquid condition by temperature regulation;
thereby side-chain chlorinating said compound while concomitantly suppressing metal-ion-promoted ring activity.

3. The method of claim 2 wherein said sequestering agent is selected from the group consisting of phosphorous tri-chloride, phosphorous pentachloride, and their mixtures.

4. The method of claim 2 wherein said compound is selected from the group consisting of o-xylene, m-xylene, p-xylene, and their mixtures and said compound contains about 0.1–25 p.p.m. of metal ion contaminants.

5. The method of claim 2 wherein $n$ in the formula of said compound is 1, 2, 3, or 4, and said compound contains about 0.01–5 weight percent of metal ion contaminants, basis weight of said compound.

6. The method of claim 2 wherein said liquid reaction medium is about 0.5–95 volume percent of ring chlorinated benzene liquid dispersant basis 100 volume percent of said liquid medium.

7. The method of claim 2 wherein said liquid reaction medium is established at a temperature between about 15° and about 250° C. and said medium is admixed with between about 0.6–6 weight percent of sequestering agent, basis weight of said compound.

8. The method of claim 2 wherein a pressure of between about 3–45 p.s.i.g. is exerted on said admixture, the compound in said admixture is reacted with gaseous chlorine under the free radical catalytic influence of actinic radiation, and the chlorinated products from the reaction are separated from the sequestering agent.

9. A method of preparing α,α,α,α′,α′,α′-hexachloro-p-xylene from p-xylene containing between about 0.1–25 p.p.m. of metal ion contaminants capable of promoting ring activity of the p-xylene, which method comprises:
   (a) establishing at a temperature within the range from about 15° to 135° C., a liquid reaction medium of said p-xylene mixed with from 0 to about 10 volume percent, basis volume of said p-xylene, of inert liquid dispersant;
   (b) exerting on said reaction medium a pressure of between about 3–45 p.s.i.g.;
   (c) admixing the resulting pressurized reaction medium with between about 0.1–10 weight percent, basis weight of said p-xylene, of metal ion sequestering agent selected from the group consisting of the chlorides and bromides of phosphorous and their mixtures;
   (d) reacting under free radical catalytic influence the p-xylene in the resulting pressurized admixture with between about 0.5–3 moles of gaseous chlorine per mole of said xylene while maintaining the admixture within said temperature range and under said pressure;
   (e) increasing the temperature of the resulting chlorinated admixture to within the range from 135° to about 250° C.; and
   (f) reacting under catalytic influence said chlorinated admixture with between about 3–5.5 moles of gaseous chlorine per mole of said p-xylene while maintaining the admixture under said pressure and within said temperature range from 135° to about 250° C.;
thereby preparing said α,α,α,α′,α′,α′-hexachloro-p-xylene while concomitantly suppressing metal-ion-promoted, p-xylene ring activity.

10. The method of claim 9 wherein said p-xylene is reacted in a first reactor maintained at a temperature between about 35° to about 90° C., with between about 1.5–2.8 moles of gaseous chlorine, and said chlorinated admixture is reacted in a second reactor maintained at a temperature between about 150° to about 220° C. with between about 3.2–4.5 moles of gaseous chlorine.

11. The method of claim 9 wherein said free radical catalytic influence of part (d) is actinic radiation and said free radical catalytic influence of part (f) is thermal catalysis, said sequestering agent is selected from the group consisting of phosphorous trichloride, phosphorous pentachloride, and their mixtures, and a pressure of about 10–35 p.s.i.g. is exerted on said liquid reaction medium.

References Cited

UNITED STATES PATENTS 3,230,268  1/1966  Kobayashi _____ 260—651

LEON ZITVER, Primary Examiner.

N. KING, Jr., H. MARS, Assistant Examiners.